Nov. 17, 1931.  J. R. ORELIND  1,832,649
THRUST BEARING
Filed June 10, 1929   2 Sheets-Sheet 1
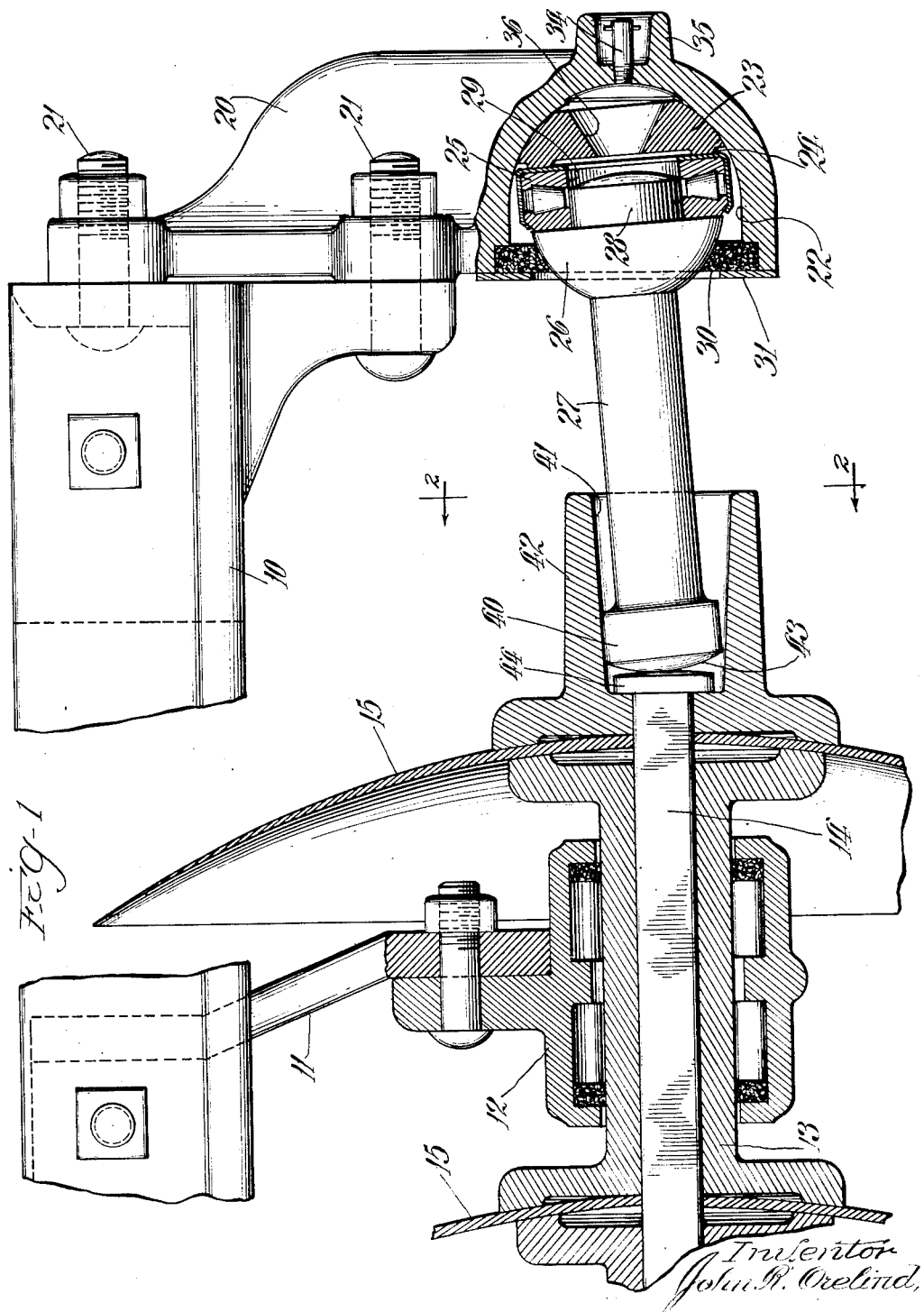

Nov. 17, 1931.    J. R. ORELIND    1,832,649
THRUST BEARING
Filed June 10, 1929    2 Sheets-Sheet 2
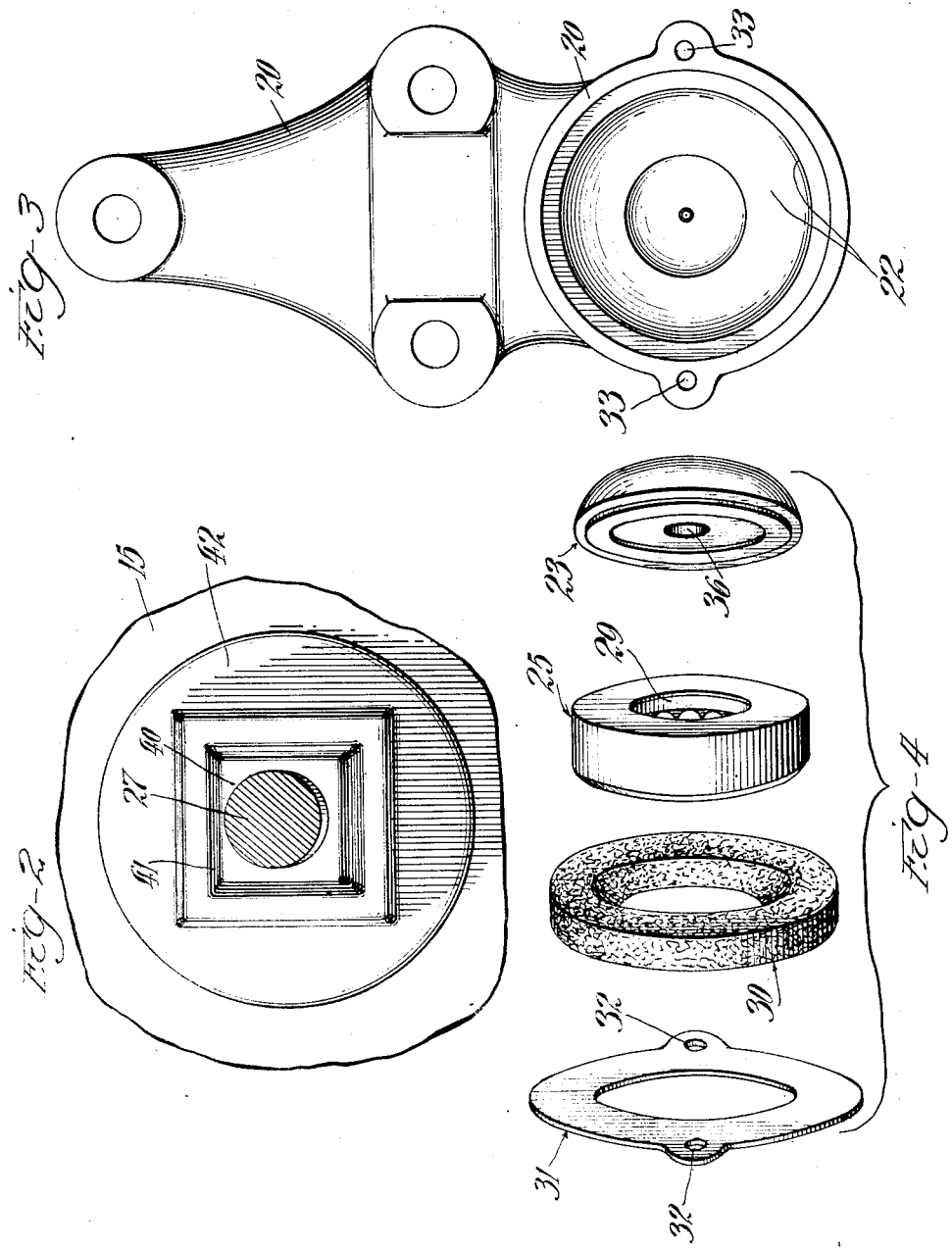

Patented Nov. 17, 1931

1,832,649

UNITED STATES PATENT OFFICE

JOHN R. ORELIND, OF MOLINE, ILLINOIS, ASSIGNOR TO MINNEAPOLIS-MOLINE POWER IMPLEMENT COMPANY, OF MOLINE, ILLINOIS, A CORPORATION OF DELAWARE

THRUST BEARING

Application filed June 10, 1929. Serial No. 369,609.

This invention relates to a thrust bearing, particularly to a thrust bearing for use in agricultural implements such as disk plows or cultivators having a plurality of disks mounted upon a shaft, all the disks rotating together and causing a heavy end-thrust on the disk shaft.

Thrust bearings for implements of this sort must be of rugged construction, they must be simple and inexpensive, and at the same time they must reduce to a minimum the friction between the parts. The present invention has been devised with these objects in view.

The general object of the invention is to provide an improved thrust bearing.

A more particular object is to provide an improved thrust bearing for agricultural implements.

Another object is to provide an improved thrust bearing for agricultural implements which will allow the portion of the implement whose thrust is to be absorbed to be slightly out of alignment with the bearing without affecting the efficiency of the bearing.

Other objects and advantages of the invention will appear from the following specification and drawings.

An embodiment of the invention is shown in the accompanying drawings in which;

Figure 1 is a partial side elevation and section of the bearing showing it applied to an agricultural implement;

Fig. 2 is a partial section on the line 2—2 of Fig. 1;

Fig. 3 is an end view of the abutment member of the bearing showing the inside thereof.

Fig. 4 is a separated perspective of some of the bearing parts.

The thrust bearing is shown applied to an agricultural implement having a frame member 10 carrying a plurality of downwardly projecting arms 11 of which one is shown in Fig. 1. These arms support bearings 12 in which are journaled sleeves 13 mounted on a square shaft 14. The sleeves serve to space a plurality of disks 15 which are mounted to turn with the shaft 14. Suitable wheels and draft connections are provided in order that the implement may be pulled over the ground. The implement is pulled forward with the disks 15 at an angle to the line of travel, the disks being employed to turn the soil. The forward movement of the implement with the disks 15 at an angle to the line of draft causes a heavy end-thrust on the shaft 14 which must be absorbed by suitable bearings. The present invention relates particularly to a bearing construction and further description of the implement is not considered necessary, reference being made to Grant Patent No. 853,510, which shows an implement of the kind in question.

It is difficult to keep the shaft 14 in perfect alignment with bearings and this is particularly true in agricultural implements where the parts are not ordinarily machined before being assembled but are cast or stamped to final shape, thereby making close fits very difficult. Accordingly, it is not only necessary to provide an end-thrust bearing for the shaft 14 but it is also necessary to provide a bearing that will absorb the thrust even though the shaft 14 may be slightly out of alignment with the bearing.

The bearing includes an abutment 20 shaped so that it may be readily attached to the frame 10 by fastening devices such as the bolts 21. This abutment has a semi-spherical opening 22 in it as shown in Figs. 1 and 3. Mounted in this opening is a relatively thick circular plate 23 having its periphery and a portion of its rear surface shaped to engage the semi-spherical surface of the opening 22. The front face of the plate 23 is substantially flat with an annular rib 24 projecting slightly forward from it. Abutting against the annular rib 24 of plate 23 is a roller bearing 25 of the thrust type. The ends of this bearing are flat, the rear end engaging the annular rib 24 of the plate 23 and the front end being engaged by the flat face of a collar 26 on the thrust member 27, the other face of the collar being spherical. The thrust member 27 has a stud 28 fitting into an opening 29 in the roller bearing 25, the only machined part of the construction being the stud 28 which is machined to fit the opening 29 in the roller bearing 25.

The front of the opening 22 in the abutment 20 is closed by a washer 30 of felt or similar material that is held in place by an annular ring 39 having openings 32 (Fig 4) for the receipt of screws that are threaded into the openings 33 in the abutment 20 (Fig. 3). This closes the opening 22 to form a lubricant chamber and at the same time permits the thrust member 27 to rotate and to have a universal movement. Lubricant is introduced into the bearings through a suitable lubricator such as an Alemite nipple 34 which is mounted in an opening in the abutment 20 and protected by a flange 35 on said abutment. The plate 23 has an opening 36 to permit the lubricant to pass through it to the roller bearing.

The thrust member 27 has a substantially square head 40 on its outer end which fits loosely into a tapered squared opening 41 in an end member 42 clamped in position on the shaft 14 of the implement. The end of this thrust member is spherical in shape as illustrated at 43 and it abuts against the spherical end of a cap plate 44 fixed to the end of the shaft 14. This insures that the thrust member 27 will rotate with the shaft 14 and at the same time it permits the thrust member to have a limited amount of universal movement relative to the normal axis of rotation of the shaft.

The construction described provides a rugged, durable thrust bearing which not only will absorb the end-thrust of the shaft 14 when the shaft is in alignment with the bearing, but it will also absorb it with equal facility when the shaft is slightly out of alignment. In fact, the shaft may be considerable out of alignment. The construction is simple and inexpensive and can be made without machining any of the parts except the stud 28. It enables a standard flat type of thrust bearing to be used thereby avoiding the expense of special parts such as would ordinarily have to be provided in order to make a roller thrust bearing allowing parts to have a universal movement about the axis of rotation. Lubrication of the bearing is made simple and the construction is such that the lubricant is retained and dust and dirt are prevented from entering the bearing.

It is to be understood that the structure shown is for purposes of illustration only and that variations may be made in it without departing from the spirit and scope of the invention as defined by the appended claims.

I claim:

1. A thrust bearing comprising an abutment housing having a semi-spherical interior, a plate mounted in said opening, said plate having a spherical rear surface engaging the interior of the abutment housing and a substantially flat front face, an anti-friction bearing engaging the front face of said plate, a thrust member engaging said anti-friction bearing, and a closure surrounding said thrust member for tightly closing said housing to form a lubricant chamber in which said plate and said anti-friction bearing operate.

2. A thrust bearing comprising an abutment housing having a semi-spherical interior, said housing having an opening through which lubricant may be inserted into its interior, a plate mounted in said housing, said plate having an opening therethrough, said plate also having a spherical rear surface engaging the interior of the housing and a substantially flat front face, an anti-friction bearing engaging the front face of said plate, a thrust member engaging said anti-friction bearing, and a closure surrounding said thrust member for tightly closing said housing to form a lubricant chamber in which said plate and anti-friction bearing operate.

3. A thrust bearing having an abutment provided with a semi-spherical opening, a plate mounted in said opening, said plate having a spherical surface engaging said abutment and a substantially flat front surface, a flat roller thrust bearing engaging said plate, said roller bearing having an opening therein at its center, a thrust member having a stud fitting into the opening in the roller bearing and a collar having a spherical surface on one side and a flat face on the other, the latter surface engaging the roller bearing, a closure engaging the spherical surface of the collar for closing the opening in the abutment to thereby enclose the roller thrust bearing parts in a lubricant chamber, and an opening in said abutment through which lubricant may be inserted into the chamber.

4. A thrust bearing for a rotatable shaft having an abutment provided with an opening therein, an anti-friction bearing mounted in said opening to have a limited universal movement relative to the longitudinal axis of the thrust bearing, a thrust member engaging said bearing, and a universal connection between said thrust member and the rotatable shaft whose end-thrust is to be absorbed.

5. A thrust bearing for a rotatable shaft having an abutment provided with an opening therein, an anti-friction bearing mounted in said opening to have a limited movement about the longitudinal axis of the thrust bearing, and a thrust member engaging said bearing, said thrust member having a substantially square head provided with a spherical end, said head engaging a substantially square opening in the rotatable shaft whose thrust is to be absorbed and contacting a spheroidal abutment on said shaft.

6. In a one-way disk plow, a rotatable shaft carrying a plurality of disks, an abutment on the end of said shaft, a thrust member, one end of said member engaging said abutment so as to have a universal movement relative to said shaft, an abutment housing, and an anti-friction bearing in said housing engaged by the other end of said thrust member, said anti-friction bearing being mounted for universal movement in said housing.

7. In a one-way disk plow, a rotatable shaft carrying a plurality of disks, an abutment on the end of said shaft, a thrust member, one end of said member engaging said abutment so as to have a universal movement relative to said shaft, an abutment housing, an anti-friction bearing in said housing engaged by the other end of said thrust member, said anti-friction bearing being mounted for universal movement in said housing, and a closure surrounding said link for closing said housing, said thrust member and closure having cooperating surfaces constructed to keep said housing closed during universal movements of said member.

In testimony whereof, I have subscribed my name.

JOHN R. ORELIND.